Aug. 9, 1966 E. WILDHABER 3,264,940
ROTARY GEAR-SHAPED TOOL
Filed June 5, 1964 3 Sheets-Sheet 1

INVENTOR:
Ernest Wildhaber

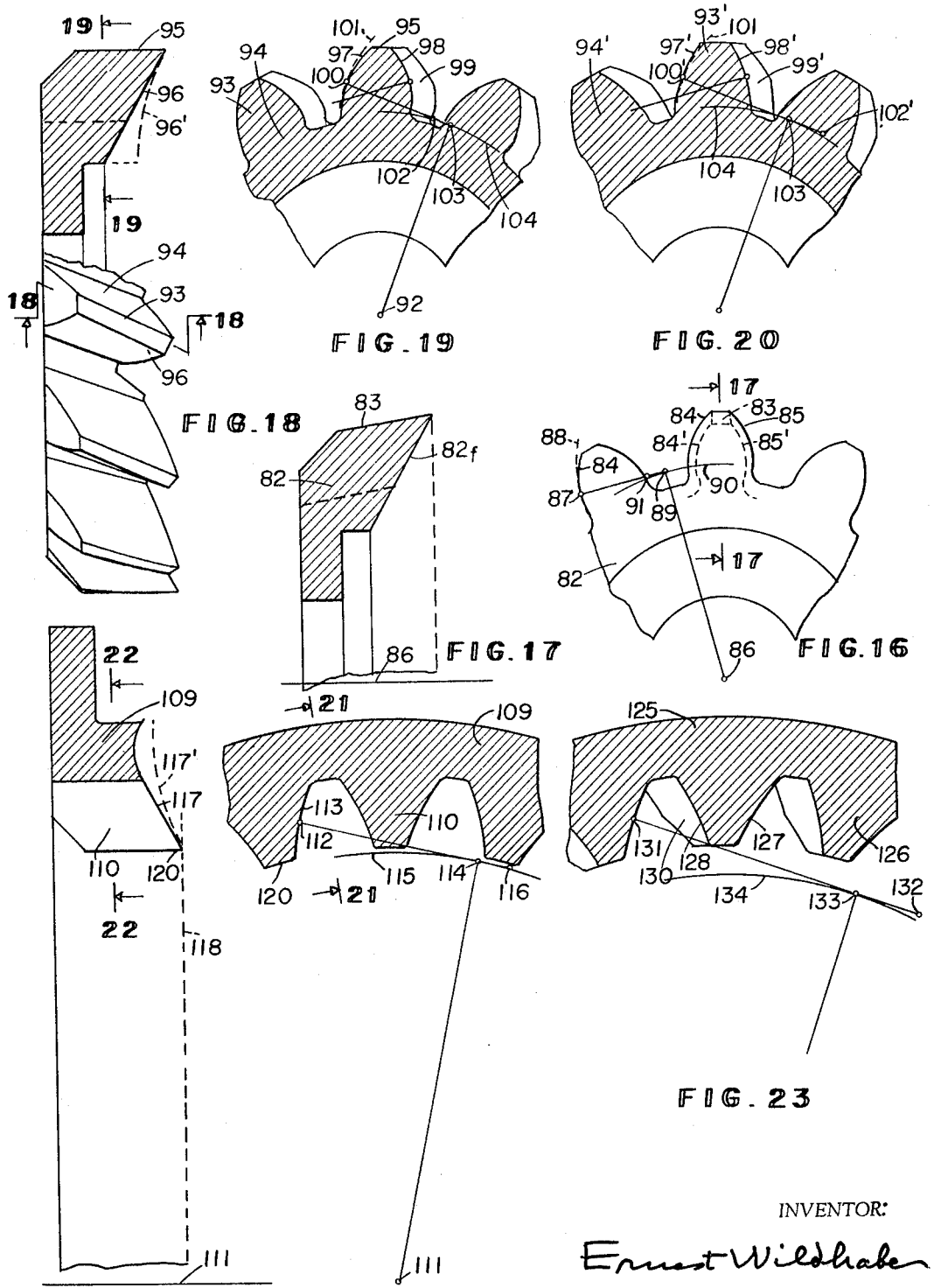

Aug. 9, 1966  E. WILDHABER  3,264,940

ROTARY GEAR-SHAPED TOOL

Filed June 5, 1964  3 Sheets-Sheet 3

INVENTOR:
Ernest Wildhaber

United States Patent Office 3,264,940
Patented August 9, 1966

3,264,940
ROTARY GEAR-SHAPED TOOL
Ernest Wildhaber, Brighton, N.Y.
(124 Summit Drive, Rochester, N.Y.)
Filed June 5, 1964, Ser. No. 372,852
16 Claims. (Cl. 90—3)

The present invention relates to rotary gear-shaped cutting tools for cutting straight and helical teeth on cylindrical gears in a process wherein a tool and gear blank are rotated on offset and angularly disposed axes in time with each other while feed motion is effected in the direction of the axis of said gear blank. The tool has a plurality of cutting teeth equally spaced in a circle about the tool axis.

The side profiles of said cutting teeth produce the side surfaces of the gear teeth. Each of said side profiles or cutting edges cuts a continuous facet or line on a tooth surface each time its gets into engagement therewith. This facet extends from top to bottom of the gear teeth. The cutting action differs from that of a hob where each side edge contacts a gear-tooth surface only in a single spot. The cuts attained by hobbing in conventional manner are made up of a series of scallops produced by different cutting teeth.

The tools of the present invention produce smoother tooth surfaces in less time.

Tools that cut continuous facets have been proposed before, for instance in my Patents Nos. 1,877,104 and 1,996,987 and others. One object of the present invention is to remove the obstacles encountered therewith.

One difficulty has been that such tools, as previously used, did not lend themselves well to cutting gear teeth from solid stock: The cutting angles worsen fast from start to end of a bite into solid metal. It has been very difficult to maintain acceptable cutting angles throughout the length of a chip. It was also very difficult to obtain a long enough chip without losing much of the efficiency of the process.

A further difficulty was to attain a sufficient accuracy of timing, as both members rotate at high speed.

The last-named difficulty is avoided in accordance with the invention by confining the process to production in substantial quantities, and then providing a timing drive with preferably no more than two pairs of gears between the work spindle and tool spindle.

The other named difficulties are overcome by providing tools with a large hook or front rake on their cutting teeth, and by solving the accompanying problems of shape. In an axial section the cutting-face profile at the end cutting edges of a tool inclined by at least one quarter of a right angle (22½°) to the radial direction of the tool, and preferably at least one third of a right angle (30°).

My principal remedy however is provision of internal mesh between the tool and gear to be produced. A tool of internal-gear shape, having internally arranged cutting teeth, is preferably used to cut external gears.

A further object is to devise a process and tool for cutting internal gears in a process of continuous timed rotation.

Another aim is to speed up the process still further by providing internal mesh between the tool and gear blank, thus attaining longer chips without resorting to large shaft angularities.

A still other aim is to provide a way of completing gears from solid material without the need of a subsequent shaving operation.

Other objects will appear in the course of the specification and in the recital of the appended claims.

In the drawings:

FIG. 4 shows the tool set to the helix angle of the gear teeth at a pitch point (P) selected for cutting, while the tool axis is inclined to the plane of the drawing.

FIG. 16 is a fragmentary axial view of another form of rotary tool.

FIG. 17 is an axial section thereof, taken along lines 17—17 of FIG. 16.

FIG. 18 is a side view of a rotary gear-shaped tool having helical cutting teeth, and partly a section along lines 18—18 of FIG. 18.

FIG. 19 is a cross-section of this tool, taken along lines 19—19 of FIG. 18.

FIG. 20 is a similar cross-section, showing cutting teeth of modified profile.

FIG. 21 is a fragmentary axial section of a rotary tool having straight cutting teeth arranged internally like the teeth of an internal gear, the section being taken along lines 21-21 of FIG. 22.

FIG. 22 is a fragmentary cross-section of this tool, taken at right angles to its axis along lines 22—22 of FIG. 21.

FIG. 23 is a fragmentary cross-section of an internal tool having helical cutting teeth, taken at right angles to its axis.

Figure 9:
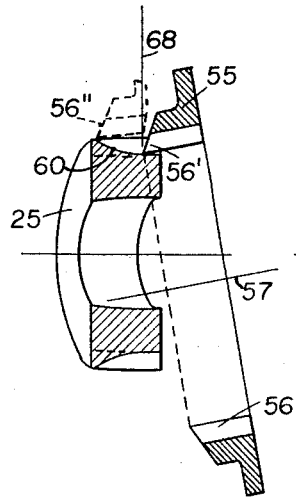
FIG. 9 is a section of an external gear taken along a tooth space, illustrating the cutting action with an internal tool.

Spur gear 24 (FIG. 1) and helical gear 25 (FIG. 2) are shown in engagement with rotary tools 26, 27 respectively that are shown in dotted lines above them and that have the general appearance of helical gear-shaper cutters. Tool and gear however merely rotate on their axes in time with each other while feed motion is effected axially of the gear in the direction of the gear teeth. The teeth can be cut either by feeding in one direction only, or by taking a roughing cut while feeding in one direction, setting the tool in with respect to the gear being cut, and finishing while feeding in the opposite direction. This permits finishing with a climb cut, as desired.

The tools 26, 27 may rotate in the direction of the arrows 28, 28′ while the gears 24, 25 rotate in the direction of the arrows 29, 29′ respectively. The workpiece is then fed from left to right for cutting from solid material. And if a fine finishing cut is to follow, it is fed from right to left. Feed in one direction is then used for roughing and the return feed for finishing.

On spur gear 24 the feed is purely in the direction of the gear axis 30. On helical gear 25 a turning motion about the gear axis is added to the axial feed, so that the feed motion is along the helical gear teeth. It is a helical motion about the gear axis at the lead of the helical gear teeth.

The tooth shape of the tools 26, 27 differs from that of helical gear-shaper cutters. It depends on the tooth number of the gear to be cut. The cutters are range cutters, exact for one gear shape only, somewhat like form milling cutters. Members 31, 32 of concave outline 31′, 42′ can be determined to rotate on the tool axes 33, 34 like the tools. They mesh with the gears 24, 25 respectively and are fully conjugate thereto. Their determination will be further described hereafter. The cutting edges of each tool are the intersections of the cutting faces with the tooth surfaces of the respective member 31 or 32. The side and end surfaces of the cutting teeth are relieved back of the cutting edges to provide cutting clearance. This results here in the usual tapered outside surface 35 shown in FIG. 2. The tools are sharpened by regrinding the cutting faces. The side surfaces of the cutting teeth should be so relieved that the tool cuts the same shape after sharpening, during its whole life. This requirement is difficult to fulfill on tools whose side surfaces of the teeth are non-involute surfaces, as they are on tools 26, 27.

Figure 2:
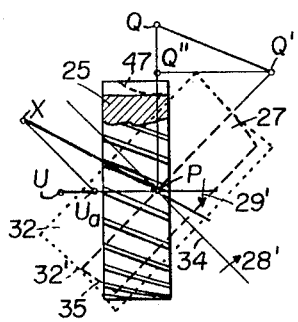
FIG. 2 is a similar view relating to a helical gear.
Figure 3:
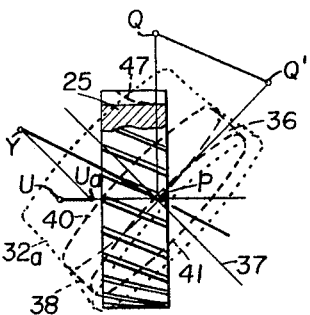
FIG. 3 is a plan view similar to FIG. 2, but showing a tool whose axis is inclined to the plane of the drawing to attain cutting clearance, and whose outside surface is cylindrical.

The tool 36 shown in FIG. 3 solves these difficulties. It achieves relief and cutting clearance by an inclination of its axis 37 to the plane of the drawing, so that its outside surface 38 can be kept cylindrical, without taper. The cutting edges appearing after sharpening are identical with the initial cutting edges and have the same distance from the tool axis. They are set to the same operating position by adjusting the tool axially in the direction of its cutting teeth. Tool 36 cuts a gear 25 identical with the gear 25 of FIG. 2. It moves in the same direction at a mean point or pitch point (P) as tool 27. 40 denotes the front of the tool. Its rear 41 is tilted up, out of the way of the teeth cut.

Figure 4:
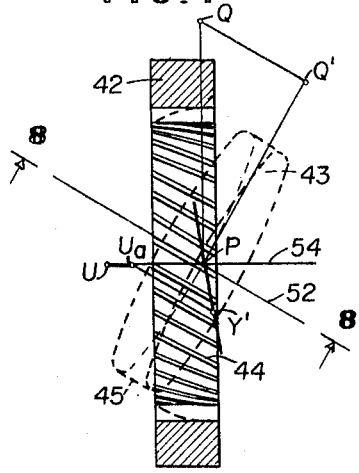
FIGS. 4 and 5 are axial sections of an internal gear having helical teeth and of a tool in engagement therewith, the sectional planes of the two figures being at right angles to one another.
Figure 6:
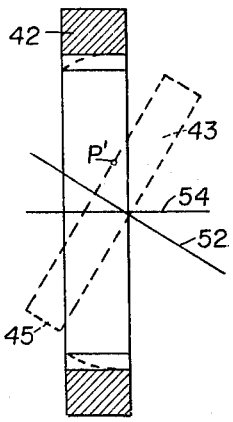
FIG. 6 is an axial section of the same internal gear, showing the tool moved about the gear axis to a position where the tool axis is parallel to the drawing plane, whereby the pitch point (P) has moved to the position (P') shown.
Figure 5:
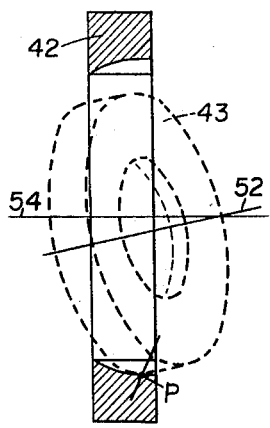

FIGS. 4 to 6 show a gear 42 and a tool 43 engaging in internal mesh. Gear 42 is an internal gear having helical teeth 44 provided internally thereon. Tool 43 has a cylindrical outside surface 45 rather than a tapered one, relief being attained by the inclination of the tool axis.

The cut into solid material

Figure 7:
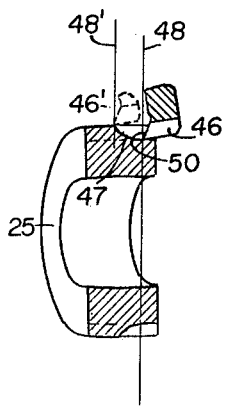
FIG. 7 is a section of external gear 25 of either FIG. 3 or FIG. 2, taken along a tooth space, and showing the tool cutting into solid material.

The nature of the cut is best shown in a section laid in the direction of a tooth space. FIG. 7 is such a section through gear 25 shown in FIGS. 2 and 3. The cutting tooth 46 of either tool 36 or 27 cuts at full depth in a normal way. This tooth is shown in dotted lines 46′ in a position where it leaves contact. The cut sweeps out a concave curve 47. Line 48 is radial of the workpiece. In accordance with the invention, the cutting face 50 of tooth 46 is inclined to line 48 at an ample rake angle, taking account of this angle in the shape of the tool.

If line 48 moves with the tool and has a fixed position with respect to the tool it gets into a position 48′ when the cutting tooth is at 46′. Line 48′ is almost parallel to line 48. In the tool position 46′ the cutting direction is steeply inclined to the horizontal direction and to the perpendicular to line 48′. A very poor cutting angle would exist there if it were not for the ample rake angle provided. Even with the ample rake angle the cutting angle is still obtuse, but tolerably so.

Figure 8:
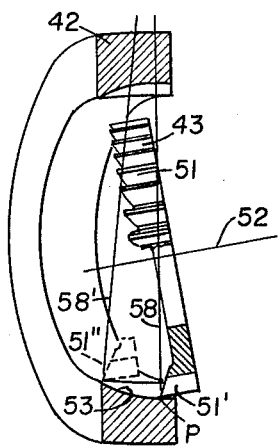
FIG. 8 is a section taken along a tooth space in the direction of lines 8—8 of FIG. 4, showing the cutting action from solid material on an internal gear.

FIG. 8 illustrates the gain attained with internal mesh between the tool and gear. Tool 43 has straight cutting teeth 51 that are parallel to its axis of rotation 52. It would have helical cutting teeth if it were to cut an internal spur gear having straight teeth, or an internal helical gear of different helix angle.

Tool 43 contacts the tooth bottom with its cutting tooth 51′. This same cutting tooth is shown in dotted lines 51″ at the end of its cutting path. Line 58 is radial of the workpiece and shows up the ample rake angle provided on tool 43. If line 58 moves with the tool it gets into a position 58′ when the cutting tooth is at 51″. Line 58′ is inclined to line 58 and converges to it on top. This improves the cutting angle, as compared with the position of lines 48, 48′ of FIG. 7. A chief gain lies in the increased length of the cut, so that the maximum inclination of cutting path 53 is decreased and a better cutting angle is achieved. This is accomplished even while decreasing the angle between the axes 52, 54 of tool and gear (FIG. 4).

FIG. 9 is a section taken along a tooth space of helical gear 25 also shown in FIGS. 2, 3, 7. Gear 25 is shown in engagement with an internal tool 55 set to the helix angle of the gear teeth. Tool 55 has straight cutting teeth 56 that are internally provided thereon and are parallel to the tool axis 57. Cutting tooth 56′ contacts the tooth bottom. As it moves to the dotted line position 56″ it describes a concave path 60 similar to path 53.

Line 68 is radial of the gear 25 and shows up the ample rake angle or hook provided on the cutting teeth. A relatively long cut and good cutting angles are attained here also.

Figure 10:
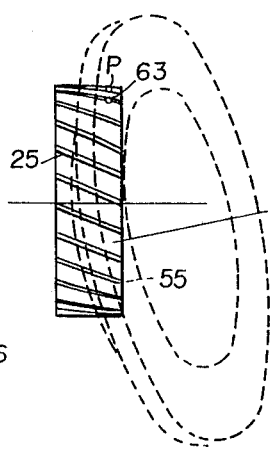
FIG. 10 is a side view of this helical gear, shown in engagement with this internal tool.

FIG. 10 shows gear 25 in a side view taken at right angles to its axis, in engagement with internal tool 55.

Figure 11:
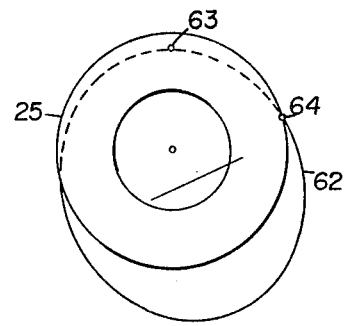
FIG. 11 is an axial view of the gear blank, taken from the left side of FIG. 10 and showing the path described by the end-cutting edges of the internal tool.

FIG. 11 shows the long arc of engagement between gear 25 and tool 55 or other internal tools, in a view taken along the gear axis. The circle described by the end-cutting edges appears as an ellipse 62. Cutting engagement extends between points 63 and 64, where 63 is the point of full-depth engagement.

Shaft angularity

As will now be shown, the shaft angularity between the tool and gear axes is preferably kept as small as compatible with good cutting action. Let us consider the velocities of the tool and gear at a suitable pitch point. The pitch point does not necessarily have to lie on the pitch surface on which the gear is to run with its mate. It may be radially further out or further in on the gear. It is preferably chosen within the tooth zone.

Figure 1:
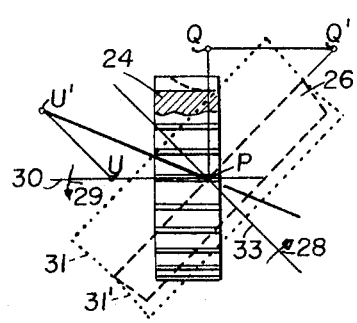
FIG. 1 is a diagrammatic plan view of a spur gear and tool, with the axes of the gear and tool parallel to the plane of the drawing. The tool is shown dotted on top of the gear and near the end of finishing feed.

In all figures the pitch point is denoted with the letter P. In FIGS. 1, 2 and 3 the velocity of the gear at pitch point P is defined by vector QP, while the velocity of the tool at pitch point P is defined by vector Q′P. The relative velocity or cutting velocity Q′Q extends in the direction of the gear teeth. Tool life depends on this relative velocity, which is kept constant and the same in FIGS. 1 to 4.

It is seen that the peripheral velocity QP of the gear is largest in FIG. 4. This is because of the decreased shaft angularity. At a given cutting velocity Q′Q gear 42 of FIG. 4 turns through more teeth than any of the other shown gears. There are more cuts than on any of the other gears at the same time interval. A similar showing occurs when cutting external gears with an internal tool. The internal mesh provides more cuts per second than the external mesh, because the shaft angularity can be kept smaller. It speeds up the process.

Tool shape

As already pointed out, a member (31, FIG. 1; 32, FIG. 2; 32a, FIG. 3); coaxial with the tool exists that is fully conjugate to the tooth sides of the gear to be produced. The tool cutting edges are the intersections of the cutting faces with the tooth sides of this member.

This member will now be defined by first describing the surface of action between it and the tooth sides of the gear. A spur gear with straight teeth meshes with its said member in the same way whether or not it performs an additional axial motion along its teeth. We can add an axial velocity equal and opposite to the relative velocity Q'Q, to cancel out sliding entirely at the pitch point P. The relative motion between gear and member is then a true rolling motion, instantaneously a turning motion about an instantaneous axis passing through said pitch point. The instantaneous line of contact between a finished tooth side of the spur gear and its said member is the normal projection of this instantaneous axis to said tooth side. Thus we are able to determine the lines of contact for all turning positions and obtain the tooth shape of this member from the known tooth shape of the gear. The various lines of contact lie in and define the surface of action, one for each of the two sides of the teeth. When the gear is an involute spur gear or involute helical gear the surface of action is made up of straight-line elements that are the normals to the gear-tooth surfaces passing through said instantaneous axis.

The direction of the instantaneous axis is attained in known manner by vectorial addition of the angular velocities. The PU, FIG. 1, extends parallel to the gear axis 30, and its length is a measure of the angular velocity of the gear. UU' is parallel to the tool axis 33, and its length measures the angular velocity of the tool, the distances PU, UU' being inversely proportional to the tooth numbers of the gear and tool. Then PU' is the sought instantaneous axis. It is contained in the surface of action.

For helical gear 25, FIG. 2, PU again defines the angular velocity of the gear. Here however we have to turn gear 25 back helically about its axis to cancel the relative velocity Q'Q for achieving rolling motion. The forward turning motion of the gear is proportional to distance PQ; the return turning motion is proportional to distance QQ'', where Q'' is the projection of point Q' to line PQ. The resultant turning velocity of the gear is defined by the reduced distance $PU_a$, where the proportion $PU_a/PU$ equals the proportion $PQ''/PQ$. $U_aX$ is proportional to the angular velocity of the tool. It is plotted from $U_a$ in a direction parallel to the tool axis to obtain X. PX is the instantaneous axis through which all the contact normals pass. The procedure is similar in the case of FIG. 3. Point $U_a$ is attained in like manner. Here however the tool axis is inclined to the drawing plane. Line $U_aY$ is parallel to the inclined tool axis and proportional to the angular velocity of the tool. It appears in projection in FIG. 3. Similarly the instantaneous axis PY is inclined to the drawing plane, as determined by geometrical addition.

The member $32_a$ that is fully conjugate to gear 25 and that turns about the tool axis at the same ratio as the tool, is here tapered and concave. Again its instantaneous lines of contact with gear 25 are the normal projections of the instantaneous axis PY to the known tooth surfaces of the gear.

Each of said fully conjugate members can also be produced mechanically with a tool describing the tooth sides of the gear while it turns about the gear axis in engagement with a rotating member.

While the cutting edges of the rotary tools lie on the tooth surfaces of such concave members (31, 32, $32_a$), the cutting edges of reciprocatory tools do not and thereby differ in shape from the rotary tools here referred to.

The procedure is analogous for internal mesh. Vector PU (FIG. 4) represents the angular velocity of the internal gear 42, while vector $PU_a$ represents its angular velocity after the gear is turned back helically to achieve a true rolling motion at the pitch point. $U_aY'$ is parallel to the tool axis and inclined to the drawing plane. Its length is a measure of the angular velocity about the tool axis 52. With internal mesh tool and gear have the same directions of rotation. Due to this change, distance $U_aY'$ is plotted from $U_a$ in a direction opposite as compared with FIG. 3. PY' is the instantaneous axis.

The same plotting direction applies to both types of internal mesh. It applies also when the tool is of internal-gear shape, while the workpiece is an external gear. The procedure follows the same lines as described.

The position of the instantaneous axis is the key to the tooth shape of the member whose tooth sides contain the tool cutting edges. The determination of the cutting edges and of the side surfaces of the tool teeth can now be carried out with the known methods of the art.

Tool shapes resulting therefrom shall now be described.

Figure 13:
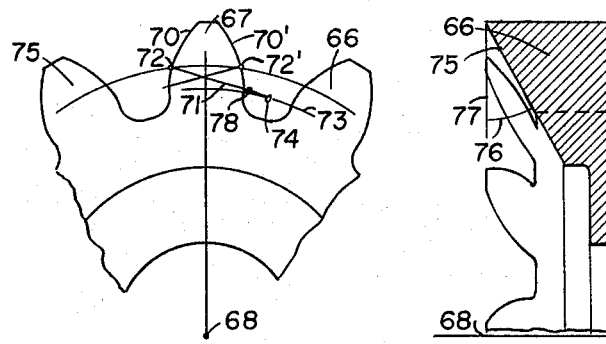
FIG. 13 is a fragmentary axial front view of a preferred form of rotary tool constructed according to the present invention.
Figure 14:
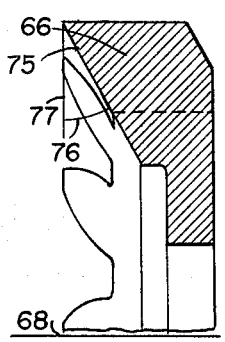
FIG. 14 is a fragmentary axial section of the tool shown in FIG. 13.

FIGS. 13 and 14 illustrate a tool 66 having a plurality of straight cutting teeth 67 equally spaced in a circle about its axis 68 for rotation. The teeth 67 are parallel to axis 68 and have a constant thickness at a constant distance from axis 68, all along their working length. The working length is understood to be the tooth length used up during the life of the tool.

In the axial view, FIG. 13, opposite cutting edges appear in projection coinciding with the profiles 70, 70' of the straight cutting teeth in planes perpendicular to the tool axis 68. Profiles 70, 70' are equally inclined to the radial direction of the tool. The normals 71 at mid-points 72, 72' are also equally inclined. They are tangent to a circle 73 that is concentric with the tool. If said profiles were exact involutes then circle 73 would be their base circle. Normal 71 contacts circle 73 at the curvature center 74 of the involute.

The cutting faces of the teeth 67 lie on a conical surface 75 that is coaxial with the tool. The conical surface 75 includes an angle 76 with the radial direction of the tool and with a plane 77 perpendicular to the tool axis. This angle is much larger than that used on known cutters. It amounts to at least a quarter of a right angle (22½°) and preferably at least thirty degrees. In view of this large angle the profiles 70, 70' are differently curved as compared with involutes concentric with the tool, whose base-circle center lies on axis 68. Tool 66 is intended to cut internal gears and has a curvature center 78 at mid-point 72 of profile 70, while the involute tangent to profile 70 at said mid-point has a curvature center 74. Profile 70 is more convexly curved at mid-point 72 and has a smaller curvature radius 72–78 there than the involute tangent thereto at said mid-point and concentric with the tool.

Figure 15:
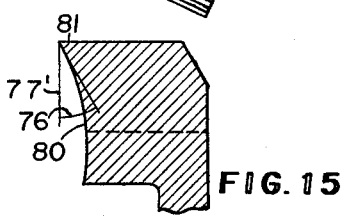
FIG. 15 is a fragmentary axial section of a rotary tool also corresponding to FIG. 13 but having a modified cutting face.

FIG. 15 shows a tool also corresponding to FIG. 13 but having a modified cutting face. The cutting faces of the tool teeth lie on a common surface of revolution of concave circular profile 80. It is inclined to a plane 77' perpendicular to the tool axis at an angle of at least a quarter of a right angle at the ends 81 of the cutting teeth.

FIGS. 16 and 17 illustrate a more conventional tool 82 where the outside ends 83 of its cutting teeth lie on a conical surface, while those of tool 66 lie on a cylindrical surface coaxial with the tool. The straight cutting teeth are relieved back of their edges 84, 85, so that later cutting edges 84', 85' appearing after much resharpening have a smaller distance from the tool axis 86. Tool 82 is intended to cut internal gears. For this reason the projected cutting edges 84, 85, as they appear in the axial view FIG. 16, are more curved at mid-point 87 (shown for profile 84) than the involute 88 tangent thereto at said mid-point and concentric with the tool. The curvature center of involute 88 lies at 89 on base circle 90.

91 is the curvature center of the projected cutting edge 84. 87–89 and 87–91 are the curvature radii.

With straight cutting teeth the increase in profile curvature on a tool for internal gears is caused by the large inclination of cutting face $82_t$ to the radial direction of the tool. There would be no increase if the cutting face were a plane perpendicular to the tool axis.

The side profiles of the cutting teeth of tool 82, in a plane perpendicular to the tool axis, also are more convexly curved at their mid-point than the involute tangent thereto at said mid-point and concentric with the tool. They have smaller curvature radii than said involute. The term involute used without further attributes always refers to involutes of a circle.

An external rotary tool with helical cutting teeth is shown in FIG. 18, while FIG. 19 is a cross-section of a tool that corresponds to FIG. 18 and is intended to cut internal gears, the sectional plane being perpendicular to the tool axis 92.

FIG. 20 is a similar cross-section of a tool intended to cut external gears. It also corresponds to FIG. 18.

Opposite side surfaces of the cutting teeth 93 of tool 94 have the same helical lead and follow helices that extend about the tool axis 92. The teeth 93 have a constant thickness on their working length at a constant distance from the tool axis. And their ends 95 lie on a cylindrical surface coaxial with the tool.

This is also true for the cutting teeth 93′ of tool 94′ (FIG. 20). Each cutting tooth 93 or 93′ has a single cutting face 96 that is common for the side-edges and the end-cutting edge of the tooth. The cutting face has an inclination of at least a quarter of a right angle to the radial direction of the tool. It may have a straight sectional profile, as shown, or a concavely curved one, as indicated in dotted lines 96′.

On both tools 94, 94′ the profiles 97, 98 and 97′, 98′ of opposite side surfaces of the cutting teeth are unequally inclined to the radial direction of the tool, the inclination being smaller on profiles 98, 98′ where the helical side surfaces 99, 99′ are visible in the axial view. The cutting teeth 93 are equally spaced in a circle about the tool axis.

At mid-point 100 profile 97 is more convexly curved than the involute 101 tangent thereto at said mid-point. Its curvature center is at 102, while the curvature center of the involute 101 is at the point of tangency 103 of the normal with base circle 104. This increased curvature is because tool 94 is to be used for cutting internal gears. Tool 94′ for cutting external gears has a decreased profile curvature. Otherwise both tools are equal. The profile-curvature center at mid-point 100′ is at 102′ beyond the curvature center 103 of involute 101.

FIGS. 21 and 22 illustrate a tool 109 of internal-gear shape, that has cutting teeth 110 internally provided thereon and equally spaced in a circle about the tool axis. FIG. 22 is a plane section perpendicular to the tool axis 111. At mid-point 112 profile 113 is less concavely curved than the involute tangent thereto at said mid-point and concentric with the tool. The curvature center 114 of said involute lies on base circle 115 while the curvature center 116 of profile 113 lies beyond point 114, so that the curvature radius 112–116 of profile 113 is larger than the curvature radius 112–114 of the involute.

The cutting faces of teeth 110 lie all in a common surface of revolution 117 coaxial with the tool. This surface is inclined to the radial tool direction and to a plane 118 perpendicular to the tool axis 111 at an angle of at least a quarter of a right angle. The surface 117 shown in full lines is an external conical surface within the zone of the cutting teeth. It is somewhat convex in peripheral direction. Dotted lines 117′ show the concave profile of a surface of revolution that may be substituted therefor. It has the same large inclination to the radial direction at the ends 120 of the cutting teeth.

FIG. 23 is a plane section perpendicular to the tool axis of an internal tool 125 having helical cutting teeth 126. FIG. 21 can be considered to also correspond to it. Opposite profiles 127, 128 of the cutting teeth are equally inclined to the radial direction of the tool, which gives the teeth 126 a somewhat leaning appearance. The inclination is larger on profile 127 opposite the profile where the helical side surface 130 is visible.

At mid-point 131 profile 127 is less concavely curved than the involute tangent thereto at said mid-point and concentric with the tool. Its curvature center 132 lies beyond the curvature center 133 of the involute, on base circle 134. The distance 133–132 increases with increasing helix angle of the tool.

Each cutting tooth 126 contains a single cutting face having a profile like that of cutting face 117 (FIG. 21), inclined by at least a quarter of a right angle to the radial direction of the tool. In a mean cylindrical section coaxial with the tool this cutting face extends along a line approximately perpendicular to the direction of the cutting tooth. This cutting face is common for and serves the side edges and the end-cutting edge of the cutting tooth.

One way of checking the profile curvature of the tools 94, 109, 125, if designed for cutting involute gears, is by making a truly involute gear having the same pitch, profile inclination, and helix angle, if any, as the side surfaces of such a tool, and running this gear at a moderate load uniformly with said tool on an axis parallel to the tool axis. Because of the modified profile curvature of the tool the tooth contact so obtained is not spread over the whole length of the profiles within the zone of engagement, but only over a reduced portion thereof. The area swept by tooth contact can be made visible in usual manner by painting up the gear teeth. The area swept clear of paint is the contact area. It covers less than the working depth of the teeth.

This checking method can be extended to non-involute gears in a way obvious in the art.

Tooth numbers

To avoid any influence of slight tool eccentricity on the surface finish I may use a tooth number on the tool equal to the tooth number of the gear to be cut, if feasible. Tool eccentricity then has no effect on the surface finish produced, because each tooth space is cut by a single cutter tooth. This disposition is feasible even with internal mesh when the teeth of an internal gear are helical and the cutting teeth of the external tool are straight or much less helical. Then the peripheral pitch of the internal gear with more helix angle is larger than the peripheral pitch of the tool, because the normal pitch is the same. The tool diameter is substantially smaller than the gear diameter.

Also a tool of internal-gear shape and substantially more helix angle than that of an external gear can cut the external gear at a one to one ratio. A similar helical tool of internal-gear shape can cut a spur gear with straight teeth at a one to one ratio.

Where equal tooth numbers of the tool and gear are not feasible or not practical I may use tooth numbers having a ratio of two integral numbers both smaller than six, for instance ratios of 3/2, 4/3 etc.

Cutting device

Figure 12:
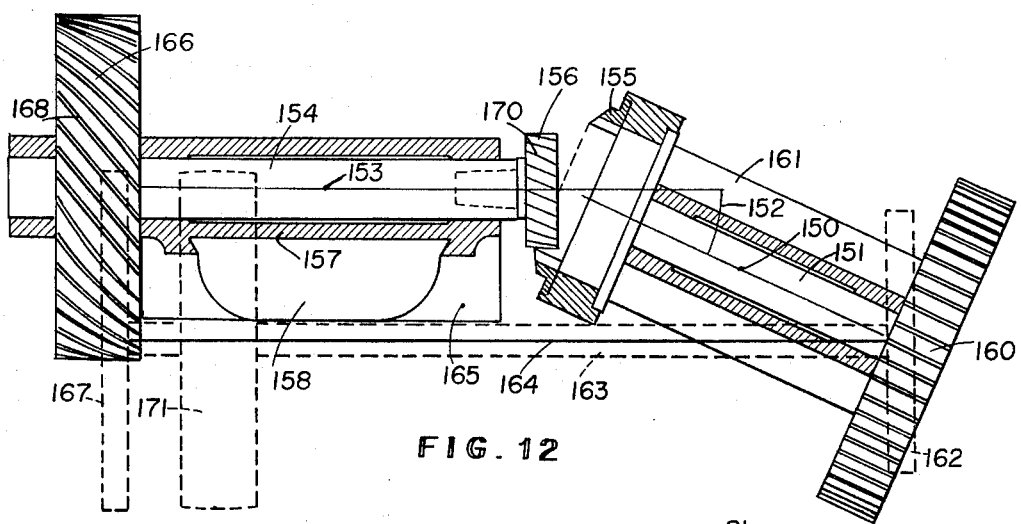
FIG. 12 is a diagrammatic plan view of a device for cutting gears with an internal tool, the axes of the tool and gear being parallel to the drawing plane.

FIG. 12 is a diagrammatic plan view of a cutting device, with horizontal rotational axes. The axis 150 of the cutter spindle 151 is offset from and set at a fixed angle 152 to the axis 153 of the work spindle 154. This angle is between ten and forty-five degrees. A tool 155 of internal-gear shape is rigidly secured to the cutter spindle 151, for cutting engagement with a workpiece 156 secured to the work spindle 154. The latter is rotatably mounted on a vertical slide 157, that permits changing the offset between the axes 150, 153 by adjusting it on column 158.

A wide-faced spur gear 160 is secured to the cutter spindle 151 that is rotatably mounted on a slide 161. Slide 161 permits tool adjustment in the direction of the tool or cutter axis 150. Gear 160 is engaged by a mating gear 162 of an overhead shaft 163 whose axis 164 is parallel to axis 153. The mesh between gears 160, 162 is not disturbed by a limited axial tool adjustment because of the wide face of gear 160.

Column 158 is part of a slide 165 that is feedable in the direction of the work axis 153. Feed motion is preferably effected by mechanical means, as by a cam and roller (not shown), but could be operated by hand. A wide-faced gear 166 is rigidly secured to the work spindle 154. It meshes with a gear 167 secured to overhead shaft 163 in a way to permit angular adjustment about axis 164. The teeth 168 of gear 166 have the same hand and the same helical lead as the teeth 170 of the gear 156 to be cut, so that upon axial feed the work spindle performs the required additional helical motion. If the workpiece 156 is a spur gear blank, a gear with straight spur teeth is substituted for gear 166.

Overhead shaft 163 also contains a pulley 171 for driving the shaft and the spindles. Pulley 171 may be belt driven.

When roughing while feeding in one direction and finishing on the return feed, the cutter spindle 151 with tool 155 is advanced axially between the roughing and finishing cut, at feed reversal. It is advanced in the direction of the tool teeth, straight for straight cutting teeth and helical for helical cutting teeth. This advance could be performed by hand but is preferably made mechanically.

The device also serves to cut internal gears with external tools. I may then secure the external tool to spindle 154 and the internal workpiece to spindle 151.

An ample range of gears can be cut on the device without changing the gear pair 160, 162, by merely changing the gears 166, 167 and the vertical position of slide 157.

Like tool 55 (FIG. 9) tool 155 (FIG. 12) is positioned so that an axial tool displacement contains a component depthwise of the gear teeth. As the tool is advanced axially it cuts deeper.

Crowned gear teeth may be obtained by gradually changing the axial tool position at a varying rate during the feed. The tool is displaced in the direction of its teeth, straight for straight teeth and helically for helical teeth. It is preferably withdrawn up to the mid-position of feed at a decreasing rate becoming zero adjacent said mid-position. And it is then advanced at a rate increasing towards the end-position of feed.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth, and as fall within the scope of the invention or the limits of the appended claims.

What is claimed is:

1. A gear-shaped tool for cutting the teeth of a gear in a process of timed rotation with feed motion in the direction of the axis of said gear, said tool and gear being adapted to engage in internal mesh while their axes are offset from and disposed at an acute angle to each other, said tool having a plurality of cutting teeth equally spaced in a circle about its axis of rotation, opposite side edges on each cutting tooth lying in a single cutting face, the side profiles of said cutting teeth in planes perpendicular to the tool axis being differently curved at their mid-portion than the involute tangent thereto at said mid-portion and concentric with said tool, so that the curvature radius at said mid-portion differs from the curvature radius of said involute.

2. A rotary tool of internal-gear shape for cutting an external cylindrical gear in a process of timed rotation and feed motion in the direction of the gear axis, whereby the tool axis and gear axis are offset from and disposed at an acute angle to each other, said tool having a plurality of cutting teeth internally provided thereon and equally spaced in a circle about the tool axis.

3. A rotary tool of internal-gear shape according to claim 2, wherein the cutting teeth are straight and parallel to the tool axis.

4. A rotary tool of internal-gear shape according to claim 2, wherein the cutting teeth are helical, said teeth having a constant thickness on their working length at a constant distance from the tool axis, opposite side surfaces of said cutting teeth having the same helical lead about the tool axis.

5. A rotary gear-shaped tool adapted to engage in internal mesh with a gear, said tool having a plurality of cutting teeth equally spaced in a circle about its axis of rotation, for cutting said gear in a process of timed rotation and feed motion in the direction of the gear axis, the tooth numbers of said tool and gear having a ratio of two integral numbers both smaller than six.

6. A rotary gear-shaped tool according to claim 5, wherein the tooth numbers of the tool and of the gear cut therewith are equal.

7. A rotary gear-shaped tool having a plurality of cutting teeth equally spaced in a circle about its axis of rotation, side edges and an end-cutting edge on each of said cutting teeth lying in a single cutting face, the inclination of said cutting face to the radial direction of said tool being at least a quarter of a right angle (22½°), at said end-cutting edge, and the side profiles of each cutting tooth, in a plane perpendicular to the tool axis, having a curvature radius at a mean point different from the curvature radius of the involute tangent thereto at said means point and concentric with said tool.

8. A rotary tool of internal-gear shape according to claim 2, where in planes perpendicular to the tool axis said cutting teeth have profiles that are less concavely curved at their mid-point than the involute tangent thereto at said mid-point and concentric with said tool.

9. A rotary gear-shaped tool for cutting internal gears, having a plurality of cutting teeth projecting outwardly from a body portion and equally spaced in a circle about the tool axis, said cutting teeth having a constant thickness at a constant distance from the tool axis and their outside ends lying on a cylindrical surface coaxial with the tool, the profiles of said cutting teeth in planes perpendicular to the tool axis being more curved at their mid-point than the involute tangent thereto at said mid-point and centered on the tool axis.

10. A rotary gear-shaped tool for cutting external gears, having a plurality of helical cutting teeth projecting outwardly from a body portion and equally spaced in a circle about the tool axis, said cutting teeth having a constant thickness at a constant distance from the tool axis and their outside ends lying on a cylindrical surface coaxial with the tool, opposite side profiles of said cutting teeth, in a plane perpendicular to the tool axis, being unequally inclined to the radial direction of the tool and being less curved at their mid-point than the involute tangent thereto at said mid-point and centered on the tool axis.

11. The method of cutting a cylindrical gear, which comprises providing a rotary gear-shaped tool adapted to mesh internally with said gear, mounting said tool and gear one inside the other on axes offset from and disposed at an acute angle to each other, rotating said tool and gear in positive timed relation, and providing feed motion in the direction of the gear axis.

12. The method of cutting a cylindrical gear, which comprises providing a rotary gear-shaped tool adapted to mesh internally with said gear and having cutting teeth arranged in a circle about the tool axis, mounting said tool and gear one inside the other on axes offset from and disposed at an acute angle between ten and forty-five degrees to each other, rotating said tool and gear in positive timed relation, and feeding said gear axially in the direction of the teeth to be produced thereon, straight for straight teeth and helically for helical teeth.

13. The method according to claim 12, wherein said tool is positioned so that upon relative axial displacement the tool moves relatively depthwise of the gear teeth, and wherein the axial tool position is changed during the feed to effect tooth crowning.

14. A gear-shaped tool for cutting the teeth of a gear in a process of timed rotation of tool and gear with feed motion in the direction of the axis of said gear, while said tool and gear are engaged in internal mesh with their axes offset from and disposed at an acute angle to each other, said tool having a plurality of cutting teeth equally spaced in a circle about its axis of rotation, each tooth having opposite side edges which lie in a single cutting surface.

15. A gear-shaped tool according to claim 14, wherein said tool has cutting teeth disposed in a cylindrical surface coaxial with the tool, so that said teeth have a constant distance from the tool axis along their length.

16. A gear-shaped tool according to claim 14, wherein the tool and gear have, respectively, different mean diameters, and the tooth zones of the two have mean diameters whose proportion is less than two to one.

References Cited by the Examiner

UNITED STATES PATENTS

| | | | |
|---|---|---|---|
| 2,267,182 | 12/1941 | Wildhaber | 29—103 |
| 2,271,753 | 2/1942 | Wildhaber | 29—103 |
| 2,567,273 | 9/1951 | Carlsen | 90—3 |
| 2,869,427 | 1/1959 | Carlsen et al. | 90—3 |

WILLIAM W. DYER, JR., *Primary Examiner.*

G. A. DOST, *Assistant Examiner.*